United States Patent [19]

Cocks

[11] 4,026,439

[45] May 31, 1977

[54] PRECISION FLUID DISPENSING AND MIXING SYSTEM

[76] Inventor: Eric H. Cocks, 4100 Galt Ocean Drive, Fort Lauderdale, Fla. 33308

[22] Filed: June 18, 1975

[21] Appl. No.: 587,976

[52] U.S. Cl. .................................. 222/49; 222/76
[51] Int. Cl.² ........................................ B67D 5/22
[58] Field of Search ............... 222/38, 49, 76, 309

[56] References Cited

UNITED STATES PATENTS

| | | | |
|---|---|---|---|
| 2,755,966 | 7/1956 | Lindars | 222/76 |
| 2,905,361 | 9/1959 | Noall | 222/309 X |
| 3,174,649 | 3/1965 | Richardson | 222/309 X |
| 3,756,292 | 9/1973 | Croslin et al. | 222/38 X |
| 3,834,586 | 9/1974 | Wilhelmson | 222/309 X |

Primary Examiner—Robert B. Reeves
Assistant Examiner—Francis J. Bartuska

[57] ABSTRACT

A plurality of fluid pumps are programmed to deliver precise amounts of fluids which are mixed to produce a desired formulation. Each pump has a calibrated actuator attached along the length of the piston rod. A switch is mounted adjacent the segmented actuator to monitor the piston travel and supply information signals to the programming console for individual control of piston travel and consequently of the fluid being pumped.

3 Claims, 4 Drawing Figures

PRECISION FLUID DISPENSING AND MIXING SYSTEM

BACKGROUND OF THE INVENTION

Many industries require the mixing of fluids of different types and colors to provide desired formulations. The mixing of custom paint colors, inks for printing, and various dyes for dyeing and printing textiles are examples of such industries.

In the printing of cloth a large variety of different colors is required. These colors have been formulated in the past by the use of technicians who measure various amounts of the different materials including colored materials for tinting. Many of these materials can produce great changes in the color texture with small variations in volume. A typical formulation might include 15 different components varying in total amount from a few ounces to several gallons for one formulation. Moreover, it is often required in a large mill to use a new formulation every few minutes.

Present methods for producing formulations include using various hand-measuring containers. The components are measured into various containers and then added to a single drum where they are later agitated and transported to the machine on which they are to be used. Apart from requiring considerable manpower, there are many drawbacks to this hand method because of human error. An operator may forget the exact measurements he has made, he may not be accurate within the time limitations required, and unclean containers may contaminate mixtures.

Attempts have been made to improve hand methods by utilizing standard paint pumps to pump individual components into a single drum for mixing. In such systems the amounts of the individual components dispensed are controlled by limit switches on the individual pumps so that the number of pump strokes can be counted thereby controlling the volume in the final mixture. This system has certain deficiencies since shutting off the air inlet to the pump may produce coasting, thereby dispensing additional material. Also, measurement in quantities less than multiples of complete strokes is not possible with limit switches, and if a double-acting pump is used, a different volume of material is dispensed on the upstroke as compared to that dispensed on the downstroke.

SUMMARY OF THE INVENTION

It is an object of this invention to provide a system for mixing various individual components in which precision control is maintained over the dispensing of the individual fluids thereby allowing a close tolerance over the final formulation. This object is realized in a single acting pump in which the upward stroke of the pump draws material into a fluid chamber and the downward stroke dispenses it.

The piston rod of the pump has attached along the length thereof a calibrated actuator mounted in operative relationship to a switch which serves as a counter to count the number of calibrated units of length which pass the switch during longitudinal movement of the piston rod. Signals from the switch are supplied to a programming console where appropriate circuitry makes use of the count information to control the volume dispensed by each particular pump.

DESCRIPTION OF THE PREFERRED EMBODIMENT

Figure 1:
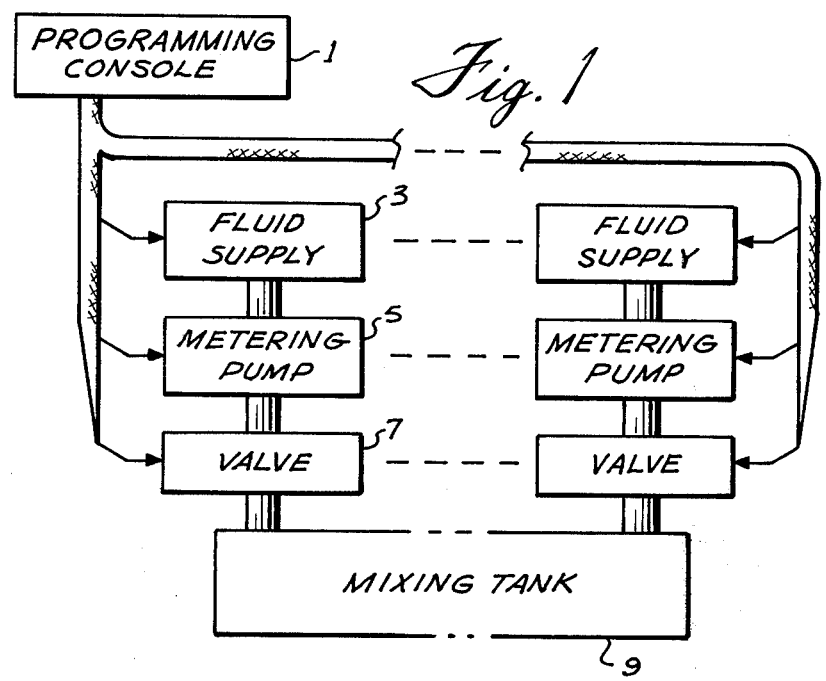
FIG. 1 is a flow diagram of the system of the invention.
Figure 2:
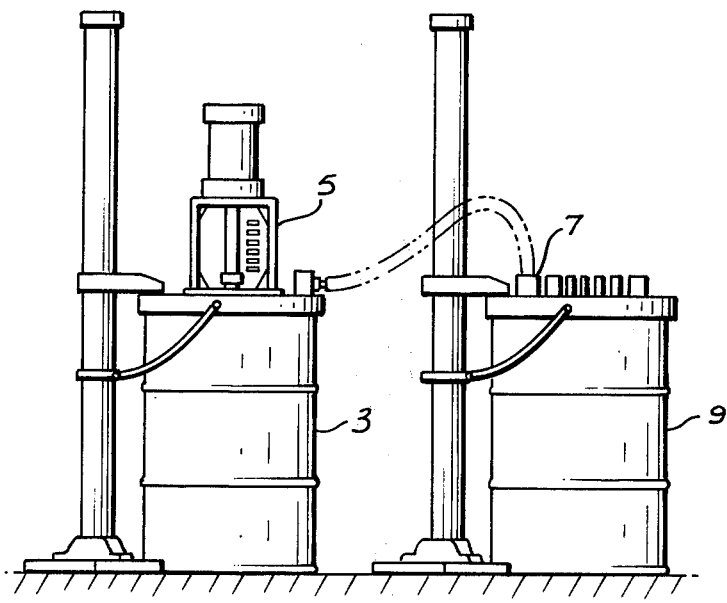
FIG. 2 is a pictorial representation of the components of the system.
Figure 3:
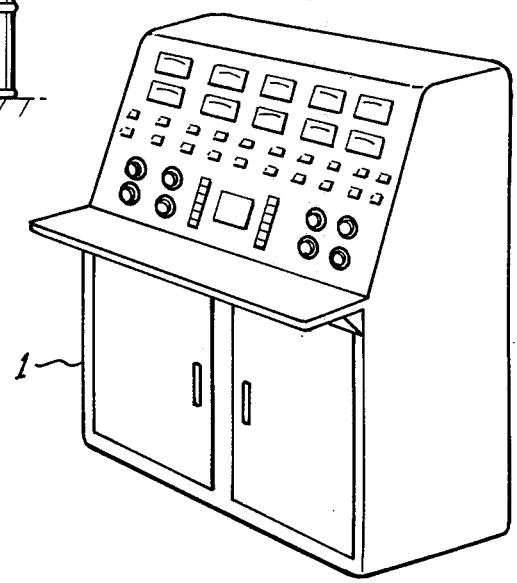
FIG. 3 is a perspective view of the programming console.

The invention will be understood more readily by referring to FIG. 1 which is a flow diagram of the system. A programming console 1 is connected to receive and transmit control signals to fluid supply 3, metering pump 5 and solenoid valve 7. The individual system components feed pre-measured fluid components into mixing tank 9 where a final formulation is mixed. In a typical system there may be twenty or more individual fluid supplies feeding into a common mixing tank.

Figure 4:
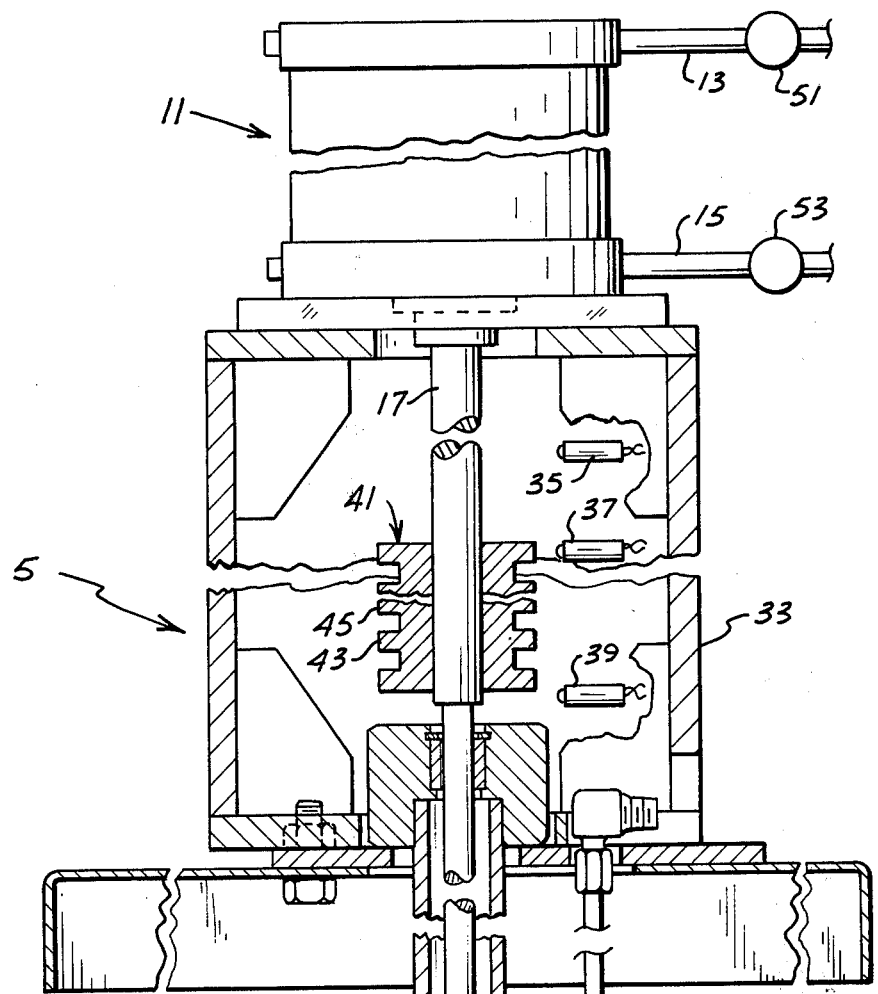
FIG. 4 is a partial section of the metering pump of the invention.

FIG. 4 is a cross-section view of a typical metering pump. The pump comprises an air section indicated generally at 11. The air section contains a piston driven by air pressure through air lines 13 and 15. A piston rod 17 extends downwardly from the air chamber and has a fluid piston 19 attached to its lower end. Piston 19 draws fluid from fluid supply 3 into fluid cavity 21 through inlet 23 which is controlled by check valve 25. The fluid is expelled through outlet 27 controlled by check valve 29 through conduit 31 to solenoid valve 7.

An intermediate housing 33 on metering pump 5 contains a plurality of switches 35, 37 and 39 which may operate on a proximity principle. These switches are mounted adjacent a calibrated actuator 41 which is shown in this embodiment as having a plurality of segments 43, 45, etc. disposed along the longitudinal extent thereof. Proximity switches 35 and 39 act as upper and lower limit switches, respectively. Proximity switch 37 acts as a counter switch to count the number of segments 43, 45, etc. as the piston rod 17 moves along its longitudinal axis. Individual electrical connections are made from each of the proximity switches to the programming console where appropriate control of solenoid valves 51, 53 can be maintained to stop and start the metering pump at precise intervals. Solenoid valves 51 and 53 are shown as simple on-off valves which can stop the air piston at any precise point in its travel, thereby yielding exact control of fluid piston 19. In practice these valves may be three-way valves with programming such that the piston returns to its uppermost position immediately after any count has been made, or if the count is interrupted for any reason. The use of three-way valves insures that the fluid cavity is held full of fluid at all times.

In addition to controlling the solenoid valves 51, 53, the programming console 1 also controls the solenoid valve 7 to cut off the flow of fluid into the mixing tank at the precise moment that pump action is stopped. This eliminates any extra discharge of fluid material which may be present in the connecting lines.

The calibrated actuator 41 can contain as many segments as is necessary to produce the accuracy required. It will be appreciated also that a plurality of proximity switches could be utilized in connection with a single segment actuator if desired. Also other forms of calibrated actuators and switches may be employed. For example, magnets culd be mounted on the actuator to operate magnetic-type reed switches, or reflective strips could be mounted on the actuator to operate photocells. The only requirement is that the programming console receive electrical signals, either digital or analog in nature, corresponding to specific distances that the piston rod has moved, allowing these signals to be converted into volume of fluid displaced.

The present system permits various desired amounts of fluid to be dispensed by designing the size of the fluid cylinder to meet the volume required and then designing the segmented actuator with segments having a spacing corresponding to the volume units desired. It will be appreciated that the programming of this system may be accomplished in any one of a number of ways, and such programming does not constitute a part of the invention itself.

What is claimed is:

1. A system for mixing formulations containing precise quantities of a plurality of individual fluid components comprising
    a plurality of fluid supplies,
    a mixing tank,
    a solenoid valve connected between the mixing tank and each of said plurality of fluid supplies,
    metering pump means connecting each of said fluid supplies to said mixing tank, each of said metering pump means comprising
    a pump housing
    a fluid chamber,
    a fluid piston mounted on one end of a piston rod and forming a portion of said fluid chamber,
    inlet and outlet means for said fluid chamber,
    fluid pressure operated means mounted on the other end of said piston rod for imparting motion to said fluid piston,
    calibrated actuator means mounted on said piston rod,
        said calibrated actuator means comprising a segmented member with segments having a spacing corresponding to the volume units desired,
    signal means mounted in operative relationship with said calibrated actuator means for producing electrical signals in accordance with the movement of said calibrated actuator means,
    programming means connected to said pump means for receiving signals from said signal means and controlling said pump means in accordance with a pre-determined program to pump precise quantities of fluid from each fluid supply into said mixing tank and,
    means connecting each of said solenoid valves to said programming means.

2. The combination according to claim 1 wherein: said signal means include means for indicating the end-of-travel of said piston rod in either direction.

3. The combination according to claim 1 wherein said signal means comprise proximity switches.

* * * * *